May 20, 1952  H. E. COBB  2,597,068
THERMAL OVERLOAD RELAY
Filed Sept. 23, 1949  2 SHEETS—SHEET 1
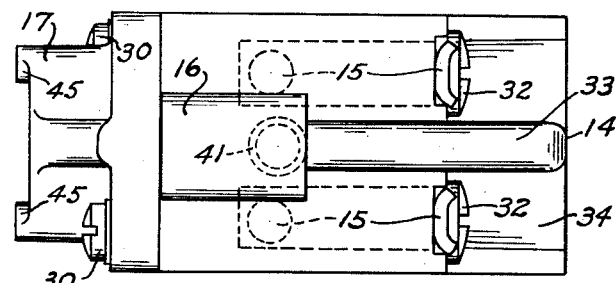
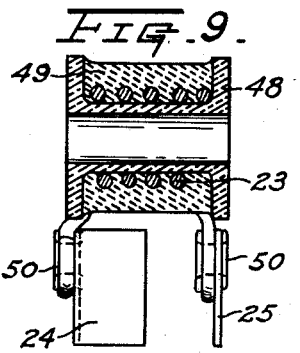
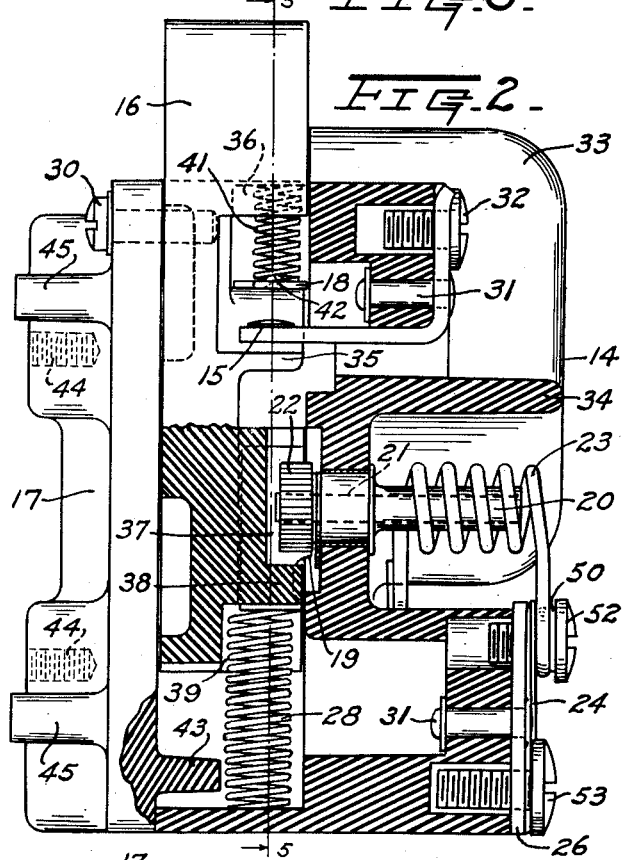
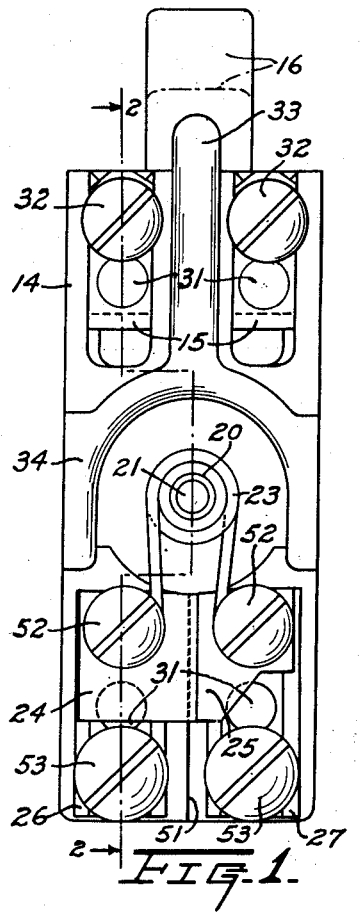
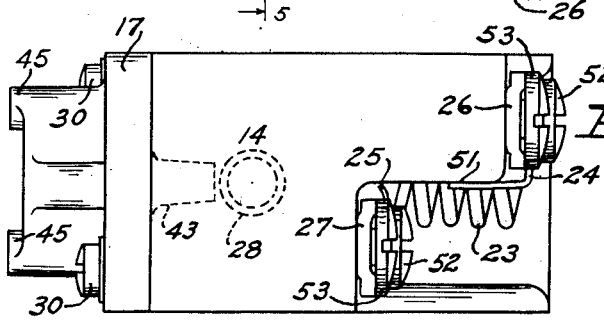
INVENTOR.
Harold E. Cobb
BY
Lieber & Lieber
ATTORNEYS.

May 20, 1952     H. E. COBB     2,597,068
THERMAL OVERLOAD RELAY

Filed Sept. 23, 1949     2 SHEETS—SHEET 2

INVENTOR.
Harold E. Cobb
BY
Lieber & Lieber
ATTORNEYS.

Patented May 20, 1952

2,597,068

UNITED STATES PATENT OFFICE 2,597,068

THERMAL OVERLOAD RELAY

Harold E. Cobb, Aurora, Ill., assignor to Furnas Electric Company, Batavia, Ill., a corporation of Illinois Application September 23, 1949, Serial No. 117,357

2 Claims. (Cl. 200—124)

The present invention relates generally to improvements in the art of protecting electrical equipment against damage due to overloading, and relates more particularly to improvements in the construction and operation of thermal overload relays adapted for use in conjunction with various types of electrical apparatus.

The primary object of my present invention is to provide an improved thermal overload relay which is simple and compact in construction, and which is also highly efficient in use and flexible in its adaptations.

Various types of thermal overload devices intended for use in protecting electrical equipment against damage due to excessive currents, have heretofore been proposed and used with varying degrees of success. One such prior device is that shown in the Furnas and Spotts Patent No. 2,296,157, granted September 15, 1942, and while this prior patented assemblage has proven highly efficient in actual commercial use, it is rather complicated and bulky in structure, difficult to assemble and apply for certain uses, and too costly for general application. Since it is desirable in order to minimize the cost of production of such devices, to be able to utilize the major portions of the assemblages in electric circuits of different ratings and to merely substitute heating coils of suitable capacities in order to meet the variable conditions, these coils should be subject to convenient replacement or substitution. Then too, these overload relays should be as small and compact as possible in order to enable installation thereof in limited spaces, and they should preferably be composed of few simple but sturdy parts so as to insure reliable operation and to permit production thereof at minimum cost. These protective units should moreover be adapted for easy assembly and dismantling in case internal inspection becomes necessary, and none of the prior thermal overload relays have embodied all of these desirable features.

It is therefore an important object of the present invention to provide an improved thermal overload unit which does in fact embody structure adapted to effectively meet all of the above mentioned requirements and conditions, and which may be manufactured at relatively moderate cost for diverse uses.

Another important object of this invention is to provide an improved device for protecting electrical apparatus against excessive current damage, wherein the actuating heating coil is of simplified structure and may be conveniently applied to or removed from the assemblage.

A further object of the invention is to provide an improved resetting slide or pusher for thermal overload relays, which carries the movable circuit make-and-break contact, the contact spring, and the circuit control pawl in a manner whereby the use of special fastenings for these parts is avoided.

Still another object of my invention is to provide a thoroughly insulated thermal overload unit wherein the terminals are all properly protected and effectively attached to the casing or body of the unit in an improved manner, so as to make the device safely operable.

An additional object of the present invention is to provide a simple but reliable thermal overload protector for electrical equipment, in which the terminals, contacts, heater coil tabs, and actuating pawl for the solder pot, are all adapted to be manufactured of inexpensive stock with the aid of punches and dies, and wherein these parts may be readily assembled to minimize the cost of production.

Another object of this invention is to provide an exceedingly compact thermal overload relay wherein the various parts are well protected within a sturdy hollow body formed of insulating material, but are quickly accessible upon removal of a closure plate formed of like material and which also detachably confines the resetting slide within the body to provide an attractive unit.

These and other objects and advantages of my invention will be apparent from the following detailed description.

A clear conception of the several features constituting my present improvement, and of the construction and operation of a typical thermal overload relay embodying the invention, may be had by referring to the drawings accompanying and forming a part of this specification wherein like reference characters designate the same or similar parts in the various views.

Fig. 1 is a front elevation of the improved thermal overload unit, looking toward the terminals and an open or unencased heating coil, and also showing the reset slide in open circuit position in solid lines and in circuit closed position in dot-and-dash lines;

Fig. 2 is a section through the same unit taken along the irregular line 2—2 of Fig. 1; but showing some parts in elevation;

Fig. 3 is a top view of the unit of Figs. 1 and 2;

Fig. 4 is a bottom view of the same unit;

Fig. 9 is a central longitudinal section through an encased heating coil element;

Figure 5:
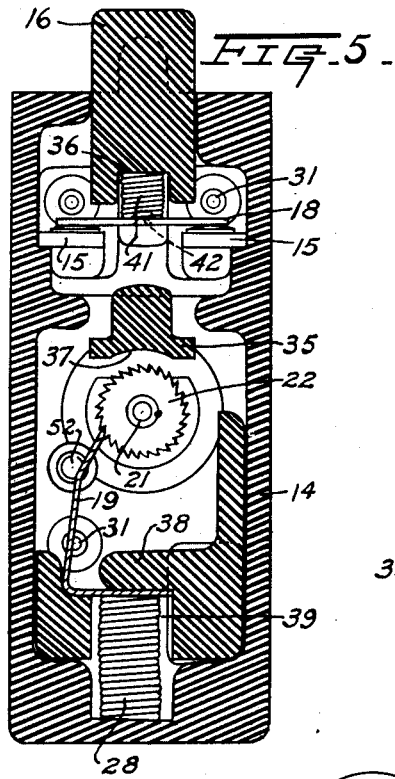
Fig. 5 is another section through the device of Figs. 1 to 4 inclusive, taken along the line 5—5 of Fig. 2, but also showing some parts in elevation.

While the invention has been shown and described as being advantageously applicable to a particular type of thermal overload unit applied only to motor circuits and having a single set of fixed and movable contacts, it is not desired to unnecessarily limit the utility thereof by virtue of this restricted embodiment; and it is also to be noted that these devices may be produced in various sizes for diverse uses and disposed in any desired position. It is moreover contemplated that specific descriptive terms used herein be given the broadest possible interpretation consistent with the disclosure.

Referring to the drawings, the typical improved thermal overload relay illustrated, comprises in general a hollow casing or body 14 having a rear recess and two laterally spaced fixed contacts 15 mounted therein; a reset slide or plunger 16 slidably confined within the body recess by a cover or closure plate 17 detachably secured to the latter, the plunger 16 carrying a movable contact 18 and a pawl 19; a solder pot 20 fixed centrally within the body 14 and having a rotary spindle 21 provided with a ratchet wheel 22 with which the pawl 19 coacts; a heating coil 23 surrounding the solder pot 20 and having end tabs 24, 25 detachably secured to terminal plates 26, 27 respectively, secured to the body 14; and resilient means such as a coil spring 28 for normally urging the plunger 16 outwardly of the body 14.

The casing body 14, slide plunger 16, and closure plate 17 are all formed of accurately moulded insulating material; and the plate 17 is removably secured to the body 14 by means of two screws 30 coacting with diagonally opposite corners thereof so as to detachably but slidably confine the plunger 16 within the rear hollow portion of the body, see Figs. 2, 3 and 4. The fixed contacts 15 are formed primarily of metal stampings and are angular in shape as illustrated in Fig. 2, and one leg of each of these contacts 15 is firmly secured to the body 14 by a rivet 31 and is provided with a terminal screw 32, while the other leg reaches into the casing and into the path of the movable contact 18 on the plunger 16, and carries a contact disk as shown. The two contacts 15 are separated from each other by a central rib 33 of insulating material formed integral with the body 14 and by an inverted U-shaped wall 34 of like material within which the solder pot 20 and heating coil 23 are located.

Figure 6:
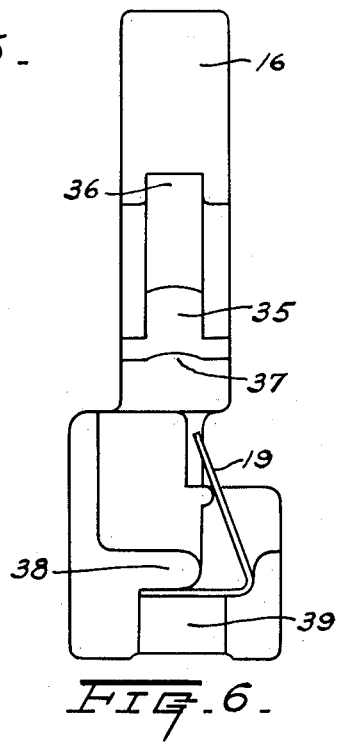
Fig. 6 is an inside elevation of the reset slide or pusher showing the spring pawl confined therein.
Figure 7:
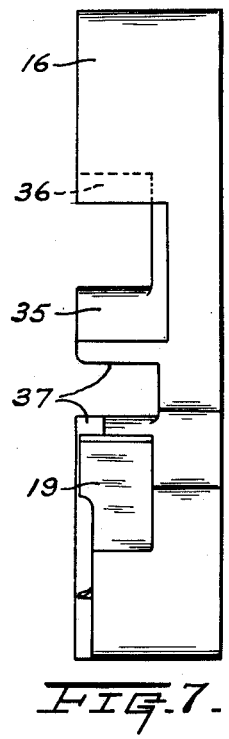
Fig. 7 is a side view of the same slide or pusher with the pawl applied thereto.
Figures 8, 11:
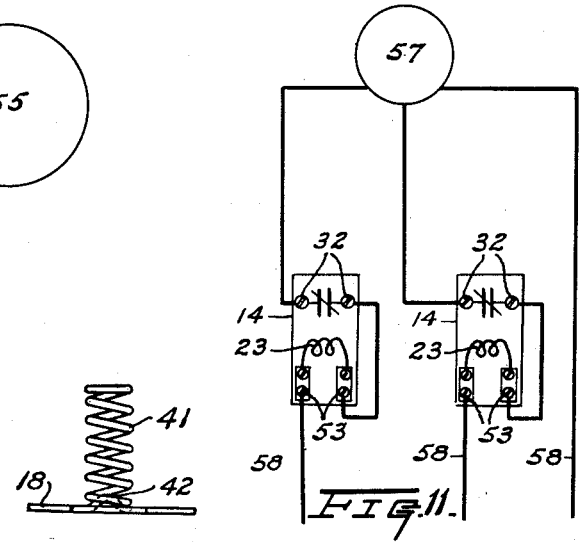
Fig. 8 is an elevation of the movable contact and spring assembly.
Fig. 11 is a diagram showing two of the improved relays applied to a three phase electric motor circuit.

The reset slide or plunger 16 is constructed as shown in detail in Figs. 2, 5, 6, 7, with its upper end protruding from the body 14, its medial portion provided with a bridge 35 having a socket 36 thereabove and a central recess 37 therebelow, and its lower end portion enlarged and provided with a transverse lip 38 and a notch 39. The rear of the plunger 16 slidably coacts with the adjacent flat face of the closure plate 17, and the movable contact 18 which is formed of a metal stamping, projects through the reset slide above the bridge 35 and is held in place by this bridge and a coil spring 41, one end of this spring 41 being confined within the plunger socket 36 while its opposite end snugly embraces a small mound 42 formed centrally upon the latter as illustrated in Fig. 8. The pawl 19 is also formed of resilient metal with the aid of punches and dies, and is frictionally confined within the plunger 16 beneath the lip 38 as depicted in Figs. 5 and 6 so that its free end may readily engage the ratchet wheel 22.

The rear cover plate 17 which is attached to the body 14 by the screws 30, has an integral lug 43 which normally extends into the body 14, and this lug serves the dual purpose of insuring proper assembly of the plate and body, and of retaining the plunger actuating spring 28 in proper position with one end confined within the plunger notch 39 and its opposite end reacting against the lower casing wall. The closure plate may also be provided with threaded sockets 44 for effecting attachment of the overload unit to a support, and with contact feet 45 for facilitating such firm attachment to uneven surfaces. The enlarged lower end portion of the reset plunger 16 prevents it from sliding out of the body 14 while the cover plate 17 slidably confines the plunger 16 in place and also retains the movable contact 18, pawl 19 and springs 28, 41 in proper position, but still permitting rapid removal of all of these parts.

The outer casing of the solder pot 20 is swaged within a central opening in the body 14 near the inner end of the wall 34 so that it cannot rotate, and the spindle 21 is normally fixed to the casing of the pot 20 by solder, but is adapted to rotate when this solder is melted by the heating coil 23. The ratchet wheel 22 is permanently secured to the outer end of the spindle 21 and is normally engaged by the pawl 19 within the plunger recess 37, so that when the circuit through the overload relay is completed the parts will be in the position illustrated in Fig. 5, whereas breaking of the circuit will position these parts as shown in Fig. 2. The heating coil 23 which surrounds the solder pot 20 within the body wall 34, may be either open as in Figs. 1 and 2, or wound about a ceramic spool 47 and encased or embedded in refractory cement 48 as in Fig. 9, and when thus encased the spool hub should snugly embrace the solder confining portion of the pot 20.

The formation and location of the terminal plates 26, 27 and the construction of the ends of the heating coils 20, constitute important features of the present invention, whereby replacement of the heating coils by others having the same or different rating or capacity is vastly facilitated. The opposite ends of each heating coil 23 project tangentially therefrom but in different planes, so that the connecting tabs 24, 25 have flat portions lying in parallel planes adapted to flatly engage the terminal plates 26, 27 respectively which also lie parallel to each other but be in different planes. The tabs 24, 25 are firmly secured to their respective ends of the coil 23 by ferrules 50 as shown in Fig. 9, and the outermost tab 24 is provided with a positioning flange adapted to coact with a flat surface 51 formed on the body 14 between the terminal plates 26, 27 as illustrated in Fig. 4. The tabs 24, 25 are normally detachably but firmly secured to their respective terminal plates 26, 27 by means of screws 52, and the terminal plates are also provided with terminal attaching screws 53. The plates 26, 27 are rigidly attached to the body 14 by rivets 31, and it should be noted that all of the rivets 31 which fasten the fixed terminals 15 and the terminal plates 26, 27 to the body 14 are exactly the same and are accessible for riveting from the inside of the body of casing. It should also be noted that the tabs 24, 25 and the plates 26, 27 are formed of metal stampings, while the coils 23 may be formed of wire of the desired rating or capacity to produce proper heating when overloaded.

Figure 10:
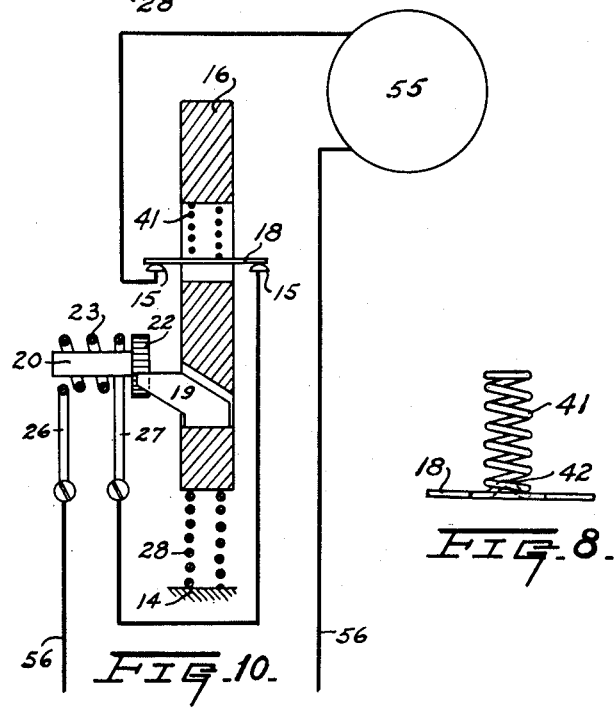
Fig. 10 is a diagram showing one of the overload relays applied to a single phase electric motor circuit.

When the improved thermal overload relay has been properly constructed and assembled it may be utilized to protect either a single or a multiphase circuit by applying a heating coil of proper rating, and the protected circuit may be either the coil circuit of a magnetic controller and the like, or an open load circuit without auxiliary apparatus as depicted in the wiring diagrams of Figs. 10 and 11. Fig. 10 depicts an automatic embodiment of one of the improved overload units in a single phase motor circuit wherein the electric motor 55 is normally energized from the power lines 56 one of which is connected directly to one terminal of the motor 55 while the other connects with the terminal plate 26. The other terminal of the motor 55 is connected to one fixed contact 15 of the unit, while the other fixed contact 15 is connected to the other terminal plate 27. The two terminal plates 26, 27 are connected to the heating coil 23 and during normal operation the movable contact 18 engages the contacts 15 and closes the circuit.

If the motor 55 is subjected to excess overloading, the heating coil 23 becomes quickly effective to melt the solder in the pot 20 and to promptly release the spindle 21 and ratchet wheel 22 whereupon the heavy coil spring 28 forces the plunger 16 and pawl 19 upwardly and thus causes the movable contact 18 to disengage the fixed contacts 15 and to thus break the circuit. The coil 23 then cools off and the solder solidifies to again unite the spindle 21 and pot 20, so that subsequent inward pressing of the plunger 16 after the overload has subsided, will again reset the unit into active position as in Figs. 5 and 10, ready for the next overload operation. The improved thermal overload units may also be utilized in like manner for the protection of multiphase circuits, and in Fig. 11 two of the overload relays are shown cooperating with a three-phase motor 57 which is energized by a main line 58. In such a system two of the lines 58 will be interrupted whenever excessive overloading occurs, and resetting of the overload relays may obviously be effected in precisely the same manner as just described.

From the foregoing detailed description of the construction and operation of my improved thermal overload relay, it should be apparent that I have in fact provided a very simple, compact and durable unit, which besides being highly reliable and efficient in operation, is also flexible in its adaptation for diverse purposes. The heating coils 23 are of simple construction due to the omission of bends at the ends thereof, and to the fact that the tabs 24, 25 lie in parallel planes adapted to be readily attached to terminal plates 26, 27 lying in similarly spaced parallel planes. The side flange on the tab 24 makes it easy to properly position each coil 23 for attachment to the terminal plates 26, 27, and the coils 23 may be similarly formed in various sizes or ratings and may be either open as in Fig. 2, or encased in ceramic material 49 as in Fig. 9, so as to make them resistant to heat shock thus giving the coils 23 support especially when weakened by heat.

The formation of the body 14, plunger and cover plate 17 of insulating material insures safe operation and adequate protection of small parts, and the insulating pusher 16 carries the movable contact 18, pawl 19 and spring 41 without separate fasteners, thus facilitating assembly of these parts. The heater circuit of the improved unit is well insulated electrically from the contact circuit, and this is an important feature since these circuits have different polarities especially when the thermal overload relays are applied to starters. The cover plate 17 besides providing a simple mounting, also detachably but slidably confines the plunger 16 and spring 28 within the body 14, and all of the terminals are attachable to the body by concealed similar rivets 31 from the rear of the hollow body 14. By forming the terminals 15, 26, 27 pawl 19, contact 18, and tabs 24, 25 of stampings with the aid of punches and dies, the cost of production is reduced to a minimum and an attractive unit results, and the improved relays have proven highly satisfactory and successful in actual use for diverse purposes.

It should be understood that it is not desired to limit this invention to the exact details of construction or to the precise mode of use of the typical thermal overload unit herein specifically shown and described, for various modifications within the scope of the appended claims may occur to persons skilled in the art.

I claim:

1. In a thermal overload relay, a hollow body having elongated guideways therein open at one end and closed at the opposite end, a plunger movable along said guideways and having therein a laterally open socket and a central recess separated from the socket by an insulating wall while an end of the plunger projects outwardly beyond said guideways through the open end of the latter, a pair of fixed contacts secured to said body and disposed on the opposite sides of said plunger near said socket, a movable contact bar extending transversely of said plunger through said socket and having movable contacts engageable with said fixed contacts to complete an electric circuit, a helical spring confined within said socket and coacting with said bar to urge the latter toward said wall, a solder pot carried by said body and having a heat releasable ratchet wheel disposed within said plunger recess, a resilient pawl frictionally confined within said plunger and cooperating with said ratchet wheel to normally hold said fixed and movable contacts in engagement with each other, and another helical spring interposed between the opposite end of said plunger and the closed end of said guideways for moving said plunger to break the electric circuit under overload conditions.

2. In a thermal overload relay, a hollow body formed of insulating material and having elongated guideways therein open at one end and closed at the opposite end, a plunger of insulating material movable along said guideways and having therein a laterally open socket and a central recess separated from the socket by an integral insulating wall while an end of the plunger projects outwardly beyond said guideways through the open end of the latter, a pair of fixed contacts secured to said body and disposed on the opposite sides of said plunger near said socket, a movable contact bar extending transversely of said plunger through said socket and having movable contacts engageable with said fixed contacts to complete an electric circuit, a helical spring confined within said socket and coacting with said bar to hold it in place and to urge the latter toward said wall, a solder pot carried by said body and having a heat releasable ratchet wheel disposed within said plunger recess, a resilient pawl frictionally confined within said plunger and cooperating with said ratchet wheel to normally hold said fixed and movable contacts in engagement with each other, another helical spring interposed between the opposite end of said plunger and the closed end of said guideways for moving said plunger to break the electric circuit under overload conditions, and a cover of insulating material detachably secured to said body to confine said plunger within said guideways.

HAROLD E. COBB.

REFERENCES CITED

The following references are of record in the file of this patent:

UNITED STATES PATENTS

| Number | Name | Date |
| --- | --- | --- |
| 1,336,066 | Briggs et al. | Apr. 6, 1920 |
| 1,699,645 | Williams et al. | Jan. 22, 1929 |
| 1,938,363 | Wilms | Dec. 5, 1933 |
| 2,006,954 | Kuhn | July 2, 1935 |
| 2,222,209 | Werner | Nov. 19, 1940 |
| 2,296,157 | Furnas et al. | Sept. 15, 1942 |
| 2,390,344 | Ayers et al. | Dec. 4, 1945 |
| 2,522,048 | Kuhn | Sept. 12, 1950 |